UNITED STATES PATENT OFFICE.

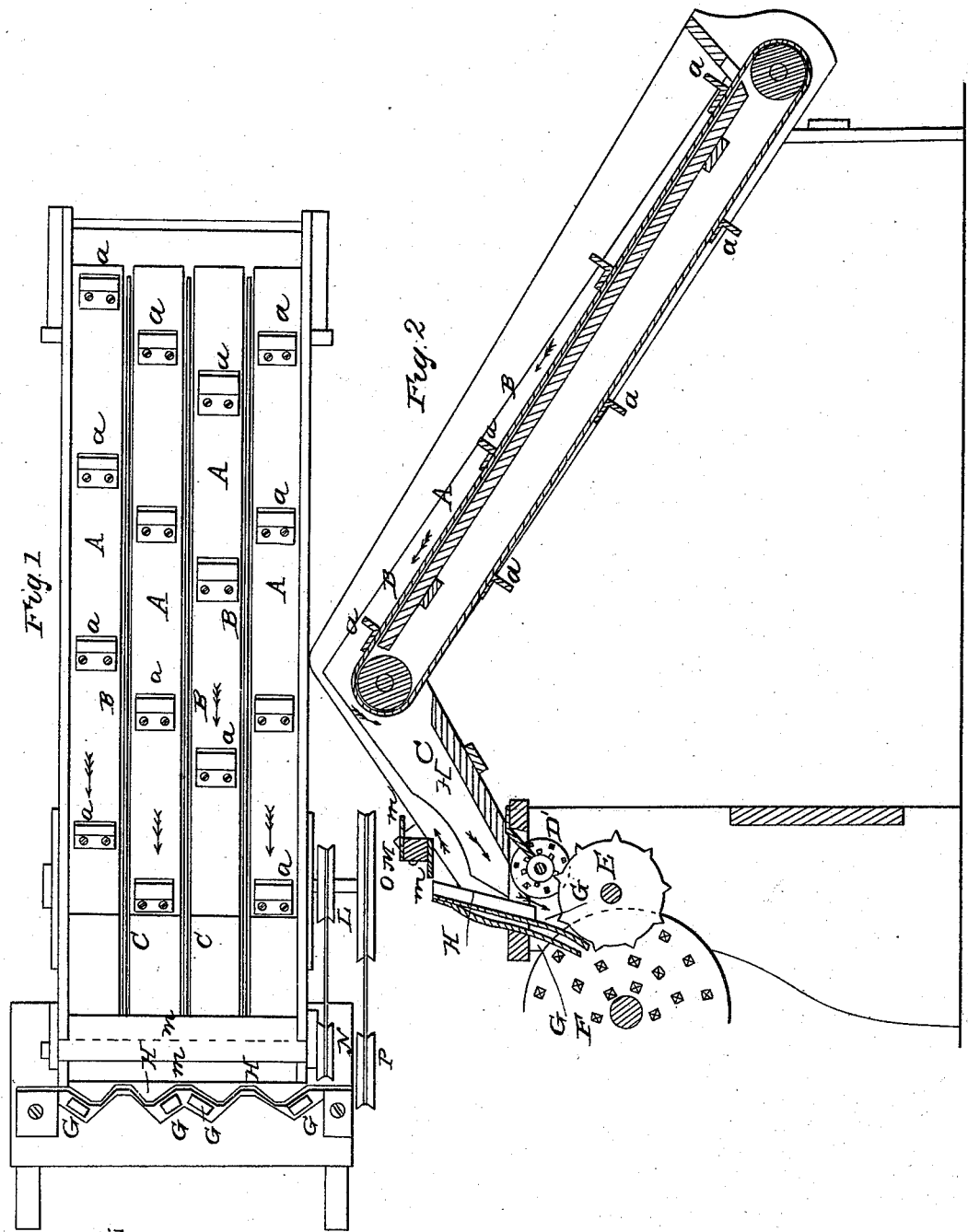

AUGUSTUS ADAMS, OF SANDWICH, ILLINOIS.

IMPROVEMENT IN CORN-SHELLERS.

Specification forming part of Letters Patent No. 54,659, dated May 15, 1866.

*To all whom it may concern:*

Be it known that I, AUGUSTUS ADAMS, of Sandwich, in the county of De Kalb and State of Illinois, have invented a new and useful Improvement in Corn-Shellers; and I do hereby declare and make known that the following is a full, clear, and exact description of the same, reference being had to the accompanying drawings, and the letters and figures marked thereon, which form part of this specification.

My said invention relates to that class of corn-shelling machines in which several ears of corn are designed to be delivered endwise between the shelling-surfaces simultaneously and separately through appropriate throats or passages by the automatic action of the machine itself; and it consists in the employment, in combination with the feeding-throats aforesaid, of a novel device whereby the said throats are kept free and open, and the ears of corn prevented from lodging and remaining therein to impede the operation of the machine, as hereinafter more fully specified.

To enable those skilled in the art to understand how to construct and use my said invention, I will proceed to describe the same with particularity, making reference in so doing to the aforesaid drawings, in which—

Figure 1 represents a plan or top view of my invention, and Fig. 2 a side elevation thereof in section at *x* in Fig. 1.

Similar letters of reference in the several figures denote the same parts of my invention.

A represents a series of endless belts provided with suitable buckets *a*, which serve to convey the ears of corn which are thrown indiscriminately thereupon up to a point above the hopper of the machine, whence the said ears descend into the shelling-surfaces. The said buckets are arranged upon the belts at such distances apart as to allow an ear of corn to lie upon the belt between them lengthwise, while the belts are of such width and the partitions B form passages thereupon of such width as will not allow said ears to lie upon the belts in any other position except at the lower end of the incline, where said partitions do not rise high enough to form distinct passages, as the carrying-buckets rise above said partitions at that part of the conveyers, as shown. The said partitions increase in width toward the upper end, and at some point rise above the said carrying-buckets, so that any ear of corn that might commence the ascent in any other than an endwise position would be caused to roll back until it assumed such position upon the belt, when it would pass up and be delivered endwise into the machine, it being impossible for an ear to accomplish the ascent in any other position.

C represent continuations of the partitions B, arranged in the hopper H, so as to render the passages between said partitions continuous to the shelling-surfaces, thus insuring the delivery of the ears into the shellers in an endwise position, as described.

D represents auxiliary or feeding wheels, which are arranged in the several feeding-throats in the hopper to facilitate the passage of the ears into the shellers and to prevent the choking up of said throats by the lodgment of two ears side by side in the same, as would frequently occur without said feeding-wheels.

It frequently happens, however, that the machines of this character are choked or clogged up in the said throats of the hopper so as to impede the machine in its operation by the falling of short or broken ears from the conveying-belts A into the throats of the hopper in such a position that while one end rests upon the inclined slide or chute of the hopper the other end rests upon or against the rear wall thereof, which serves to direct the ears down into the machine, and prevents their falling over upon the top of the same.

To obviate this difficulty and prevent the clogging up of the throats for this cause, I arrange immediately over the said throats and near the lower end of the same, supported in suitable bearings attached to the sides of the apparatus, a transverse bar, (marked M,) whose journal at one end projects out and is provided with a pulley, N, by means of which and the pulley L, with the cord or band passing around the same, said bar is revolved in the direction indicated by the arrow in the drawings. The said bar M is provided, as shown, with two wings or flanges, (marked *m*,) arranged as indicated in the drawings, so that as said bar M revolves, as aforesaid, said wings *m* constantly act to throw back the uppermost end of the ear and cause it to fall upon the incline of the hopper, and so slide down into the shellers, as desired. The bar M may be provided with any desired number of the wings *m*, or with only one, as preferred, as the object aimed at would be accomplished in either case; or the bar itself may be made of such dimensions that its angles shall subserve the same purpose; and, in fact, any bar or shaft having any irregularity upon it which would give intermitting blows upon the ears of corn as it revolves as aforesaid, may be used, if desired. The shaft M or its equivalent may be revolved by a belt, as shown, or by gearing, or in any convenient and suitable manner.

Having described the construction and operation of my invention, I will now specify what I claim and desire to secure by Letters Patent:

In combination with a series of feeding-throats in the hopper of a corn-shelling machine, the use or employment of a rotating bar or shaft, M, provided with one or more suitable projections or angles, or a series of projections or angles, corresponding with said series of feeding-throats, arranged and operating substantially as herein specified and shown, and for the purposes set forth.

AUGUSTUS ADAMS.

Witnesses:
W. E. MARRS,
JNO. W. HERTHEL.